Nov. 5, 1963    M. O. HOLTAN    3,109,326
CHANGE SPEED POWER TRANSMISSION
Filed Dec. 12, 1960    2 Sheets-Sheet 1

INVENTOR.
MAURICE O. HOLTAN
BY
ATTORNEY

Nov. 5, 1963  M. O. HOLTAN  3,109,326

CHANGE SPEED POWER TRANSMISSION

Filed Dec. 12, 1960  2 Sheets-Sheet 2

INVENTOR.
MAURICE O. HOLTAN
BY
Miles Kenninger
ATTORNEY

United States Patent Office 3,109,326
Patented Nov. 5, 1963

3,109,326
CHANGE SPEED POWER TRANSMISSION
Maurice O. Holtan, 2012 Menomonee River Parkway,
Wauwatosa, Wis.
Filed Dec. 12, 1960, Ser. No. 75,424
4 Claims. (Cl. 74—792)

This invention relates to improvements in power transmission with speed change, and particularly to a transmission for small vehicles such as golf carts and the racing vehicles now called "karts."

There are many uses for means for transmitting power from the well-known small and relatively high speed gas engines, especially where only a limited number of forward speeds and one reverse speed are required. In small vehicles such as golf carts, racing karts and the like, the small and high speed internal combustion engine shaft can be connected by any one of several ways to a jack shaft on which are mounted clutches. The jack shaft is connected by two sets of sprockets and chain with the drive axle, the two sets of sprockets being of different ratios so that the axle can be driven at two different forward speeds. Gearing and a control therefor may be provided on the jack shaft for reversing the direction of application of power to the axle, it being understood that the reversing mechanism may be omitted without substantial change in the balance of the drive, if only forward movements are required.

By use of centrifugally operated clutches, a jaw clutch may be used to connect either set of sprockets and chain to the jack shaft. The use of centrifugally operated clutches allows the jaw clutch to engage without shock inasmuch as the power is not applied until the shoe of the centrifugal clutch engages in consequence of motion derived by way of the jaw clutch. The drive may include sprockets and gears of widely different sizes so that relatively large differences in speeds may be obtained, and the drive is relatively simple and cheap.

Figure 1:
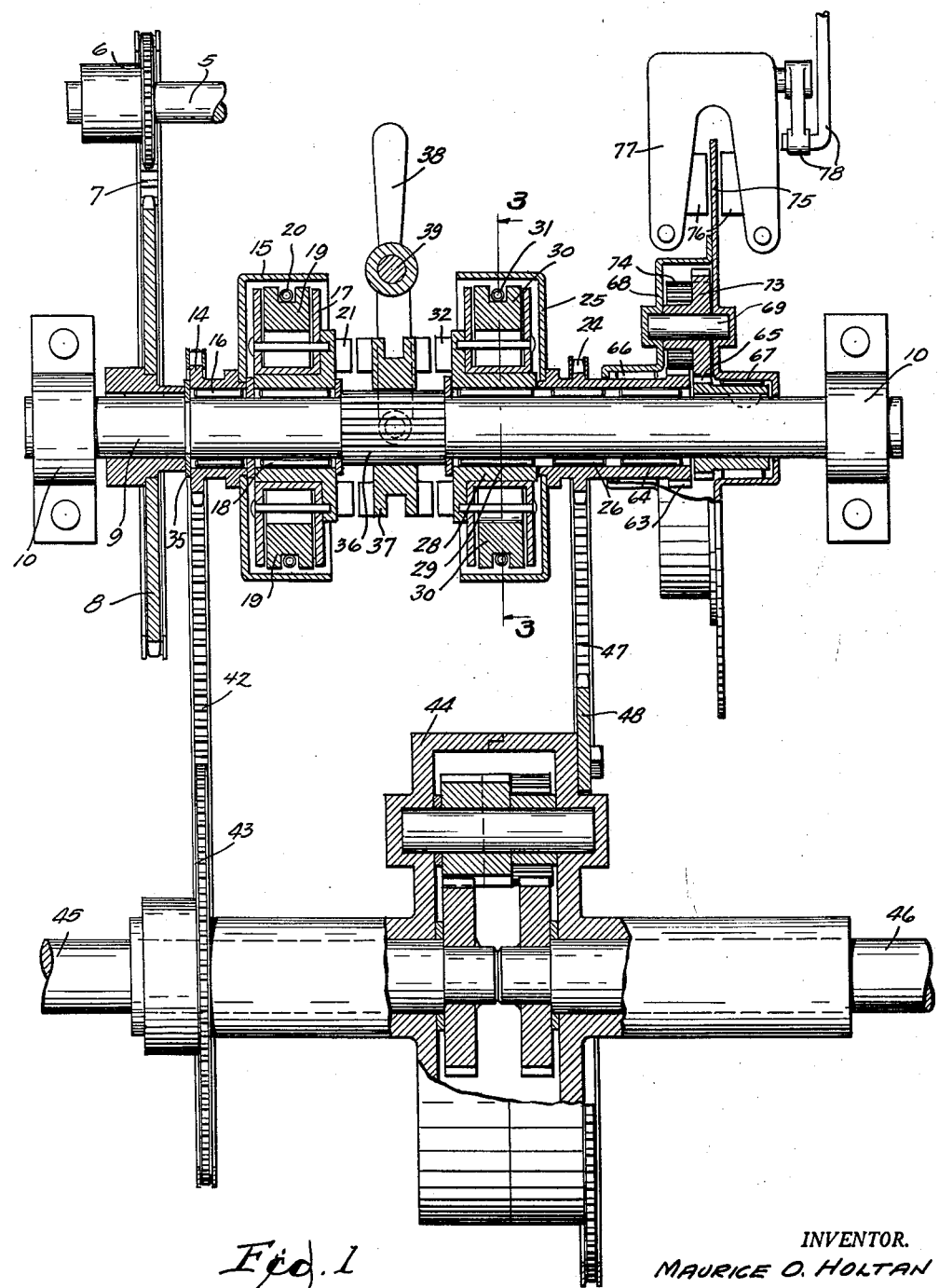
FIG. 1 is a somewhat diagrammatic illustration partially in side elevation and partially in section of one embodiment of the present invention, with two forward speeds and with means for securing one reverse speed.

A particular feature of the present invention is the use in transmissions of jaw clutches in series with the driving elements of centrifugal clutches so that the advantages of synchro mesh are achieved at greatly reduced expense. By way of exemplifying the invention, I have shown a number of different transmission arrangements. In that shown in FIG. 1, shaft 5 may be an end of the shaft of an internal combustion engine or other source of power. It has a sprocket 6 thereon for receiving a chain 7. The chain 7 drives a sprocket 8 which is mounted on shaft 9 supported in bearings 10. Obviously the shaft 9 can be coupled otherwise to an engine shaft or to the shafts of several engines and such coupling is not an essential part of the present invention.

Figure 3:
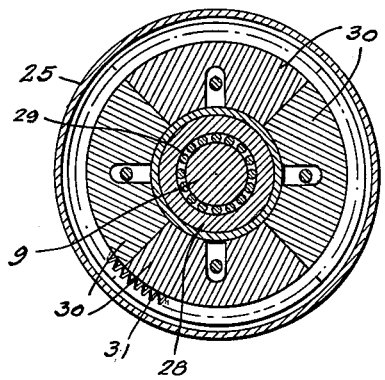
FIG. 3 is a cross section on the line 3—3 of FIG. 1, of one of the centrifugally operated clutches.

So far as the present transmission is concerned, the shaft 9 is the input or drive shaft. Through means hereinafter disclosed, it may selectively be coupled by a jaw clutch to the driving elements of either of two centrifugal clutches which drive an output or driven shaft at different rates. The centrifugal clutch assemblies are similar. In that shown at the left in FIG. 1, a sprocket 14 is formed integral with an outer casing 15 which is the driven element of the clutch. Both the sprocket and clutch casing are rotatably supported on the input shaft 9 by a bearing 16 (see also FIG. 3).

The driving element of the centrifugal clutch comprises an inner ring 17 mounted on a bearing 18 and having weights 19 mounted for radial movement and encircled by a spring 20. The driving element 17 is provided with jaw clutch teeth 21 extending laterally therefrom.

Another centrifugal assembly includes sprocket 24 integral with outer casing 25 comprising the driven element of the centrifugal clutch and rotatable on bearings 26 on shaft 9. The driving element of the centrifugal clutch includes an inner portion 28, bearings 29, weights 30, spring 31 and jaw clutch teeth 32, all related to one another as previously described.

The above centrifugal clutch structures are located on the input shaft 9 by snap rings 35 or the like and in such way that the jaw clutch teeth 21 and 32 are axially spaced in opposition. The part of the input shaft 9 between the two centrifugal clutches is splined as indicated at 36. Movable jaw clutch member 37 is complementary to and slidable along the shaft on the splines. A conventional shifting lever 38 pivoted at 39 engages the jaw clutch collar 37 for the shifting thereof in either direction from the neutral position (in which it is illustrated) to engage, selectively, either the jaws 21 or the jaws 32. Assuming that only two forward speeds are required, the above sprocket-clutch sub-assemblies are identical excepting for the size of the sprockets 14, 24.

By way of exemplification, the sprockets 14 and 24 of the respective centrifugal clutch driven elements 15 and 25 are connected respectively by chains 42 and 47 with sprockets 43 and 48, both of which are fixed to the differential casing 44 which differentially drives the axle shafts 45 and 46. The present invention is not concerned with the differential, which may be assumed to be of the type disclosed in my copending application Serial No. 52,080. In fact, it is not essential to the present invention that the drive from the clutch assemblies shall include differentially connected output shafts. Neither is it essential to the invention that any means of reversal of the output shaft be provided. However, this can conveniently be done in any number of ways including the provision of a planetary reverser as shown in FIG. 1.

The hub of sprocket 24 may be extended and provided with a gear 63, another bearing 64 being provided to support the gear. Gear 65 is mounted on shaft 9 adjacent to the gear 64 and both gears 64 and 65 are provided with bearings 66 and 67 for rotatably supporting housing 68. Such housing provides pockets for receiving the ends of one or more planet shafts 69 for planet gears such as 73. The planet gear 73 meshes with planet gear 74 which, in turn, meshes with the driven sun gear 63. The arrangement is such that drive through gears 65, 73, 74 and 63 occurs when rotation of the housing 68 is arrested. This may conveniently be done by extending one side of the housing to provide a brake disk 75 which may be clamped between brake pads 76 mounted in yoke 77 and actuated to and from disk engagement by means of linkage 78.

When the present drive is to be used for a racing kart, it is a simple matter to substitute the present drive axle for the prior axle and to interpose the transmission in the drive to the drive axle from the engine shaft. Thus a drive with two forward speeds or two forward and one reverse speeds are easily obtained. The engine speed need not be change when the gears are being shifted as there is no transmission of power until a centrifugal clutch engages and such clutches act with little shock or jarring.

Figure 2:
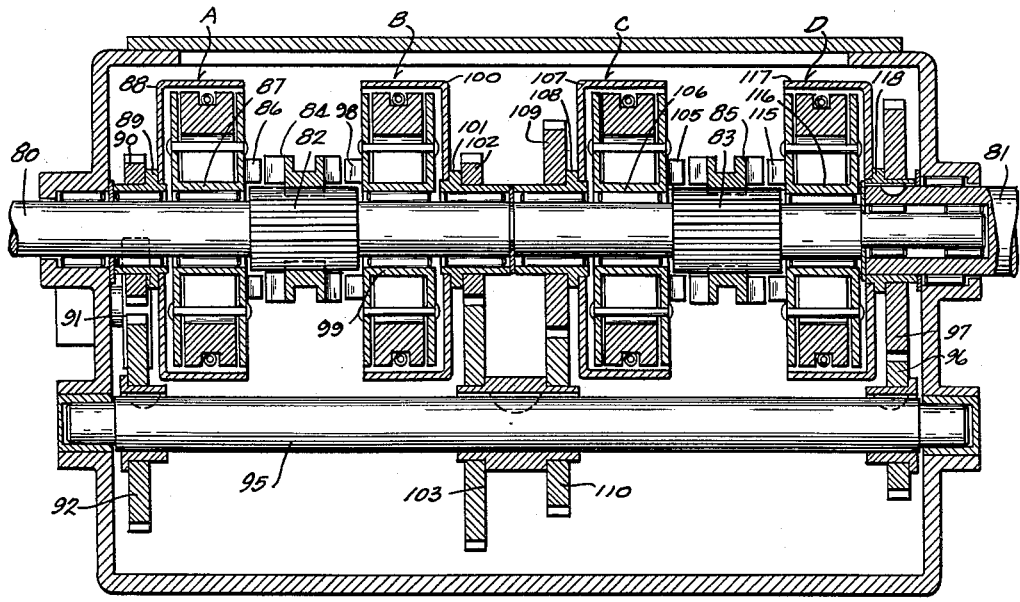
FIG. 2 is a diagrammatic illustration partially in side elevation and partially in section of another embodiment of the invention providing for three forward speeds and reverse.

FIG. 2 exemplifies a construction in which the input shaft 80 and the output shaft 81 are in axial alignment, the end of the input shaft desirably being piloted within the output shaft as shown. The input shaft has splines at 82 and 83 on which the respective jaw clutch collars 84 and 85 are reciprocable, these being driven through the splines by the input shaft.

If the jaw clutch collar 84 is moved to the left from the position shown in FIG. 2, it will engage the driven clutch jaws 86 on the inner or driving element 87 of a first centrifugal clutch A. The driven shell 88 of the centrifugal clutch A is provided on its hub 89 with a gear 90 which is the driving gear of a reversing gear set. The motion is communicated through the idler 91 to the driven gear 92 on jack shaft 95. The jack shaft is connected by gears 96 and 97 with the output shaft 81 above referred to. By way of example, and not by way of limitation, the ratio of the reversing gear set may be 14 to 22 and the ratio of the output gears 96 and 97 may be 16 to 26. The examples given are selected from one particular commercial exemplification.

If the jaw clutch 84 is shifted to the right as viewed in FIG. 2, it will engage and drive the driven jaws 98 connected with the inner or driving element 99 of a second centrifugal clutch B. The outer shell 100 which constitutes the driven element of clutch B is mounted on the hub 101 which carries gear 102 meshing with gear 103 on the jack shaft 95. By way of exemplification only, it may be noted that in one commercial embodiment the gears have a ratio of 14 to 28.

If the jaw clutch collar 85 is shifted to the left from the neutral position in which it is shown in FIG. 2, it will be engaged with the jaws 105 on the inner or driving element 106 of the centrifugal clutch C. The outer shell 107 which is the driven element of clutch C is mounted on a hub 108 which carries gear 109 meshing with gear 110 on the jack shaft 95. These gears may have a 1 to 1 ratio, or any other suitable ratio.

If the jaw clutch collar 85 is moved to the right from the position shown in FIG. 2, it will engage the jaws 115 on the driving element 116 of centrifugal clutch D. The driven shell 117 of clutch D is fixed to the hub 118 upon which the gear 97 is mounted, this being keyed to the output shaft 81.

It will be understood that any appropriate type of centrifugal clutch may be used at A, B, C and D. Merely by way of exemplification, the clutches shown are of the general construction illustrated in FIG. 3 and described above in connection with FIG. 1.

No shifting means is illustrated except that the jaw clutches 84 and 85 do, in each instance, comprise collars engageable by conventional forks for shifting purposes.

It will be apparent that if jaw clutch collar 84 is engaged with jaws 86, the output shaft 81 will be driven in reverse at a reduced speed as compared with the speed of input shaft 80. If clutch collar 85 is engaged with the jaw 115, the drive through centrifugal clutch D will be direct drive to operate the output shaft 81 at the same speed and direction as shaft 80.

If the clutch collar 85 is moved to the left to engage jaws 98, the drive through centrifugal clutch B will actuate the output shaft 81 at greatly reduced speed through the gears 102 and 103 and jack shaft 95 and gears 96 and 97.

If the clutch collar 85 is moved to the left to engage jaws 105, the drive through centrifugal clutch C will actuate the output shaft 81 at an intermediate speed through gears 109 and 110 and jack shaft 95 and gears 96 and 97.

In all cases, the driving elements of the several centrifugal clutches are at rest and the centrifugal shoes of the several centrifugal clutches are disengaged whenever none of the clutches is engaged. The engagement of the jaw clutch imparts motion to the driving centrifugal clutch element previously at rest and only in response to such motion do the centrifugal shoes engage the respective driven element of the actuated centrifugal clutch. Since this engagement is frictional, there is no shock at any time either at the time the jaw clutch is engaged or at the time it takes effect to produce the desired transmission of motion to the output shaft.

I claim:

1. In a variable speed power transmission, a driving shaft, a driven shaft, driving sprocket wheels of similar diameters rotatably mounted on the driving shaft, plural centrifugal clutches each having a part connected with one of the driving sprocket wheels and a part rotatable on the driving shaft, a jaw clutch axially movable on the driving shaft for engagement with the centrifugal clutches for severally connecting the same with the driving shaft, driven sprocket wheels of different diameter on the driven shaft, and chains for connecting a driving sprocket wheel with a driven sprocket wheel.

2. In a variable speed power transmission, a drive shaft, a driven shaft, a jaw clutch engaged with the drive shaft, plural centrifugal clutches each having a first part selectively engageable by the jaw clutch for rotation of a second part of the centrifugal clutches, and plural means severally connecting the second part of the centrifugal clutch with the driven shaft for transmitting rotary motion thereto at different speeds and at speed other than that of the drive shaft.

3. In a variable speed power transmission, a drive shaft having a splined portion, a driven shaft, a jaw clutch axially movable on the splined drive shaft portion, plural centrifugal clutches each having a first part selectively engageable by the jaw clutch for the rotation of a second part of the centrifugal clutch, and plural means severally connecting the second part of the centrifugal clutches with the driven shaft for transmitting rotary motion thereto, said means being of different sizes for differently changing the speed of rotation of the driven shaft relative to the speed of rotation of the drive shaft.

4. In a variable speed power transmission, a drive shaft, a driven shaft, a jaw clutch engaged with the drive shaft, plural centrifugal clutches each having a first part selectively engageable by the jaw clutch for rotation of a second part of centrifugal clutch, plural means severally connecting the second part of the centrifugal clutches with the driven shaft for transmitting rotary motion thereto in the same direction of rotation, and planetary gearing connecting the drive shaft with one of the said motion transmitting means for reversing the direction of movement thereof, the planetary gearing including gears severally attached to the drive shaft and to said one of said motion transmitting means, a housing rotatable about the gears, planet gears rotatably mounted in the housing and means for restraining rotation of the housing and thereby causing transmission of power by the planetary gearing.

References Cited in the file of this patent

UNITED STATES PATENTS

| | | |
|---|---|---|
| 1,707,053 | Dillon | Mar. 26, 1929 |
| 1,795,135 | Molly | Mar. 3, 1931 |
| 1,969,560 | Keller | Aug. 7, 1934 |
| 1,978,834 | Cotterman | Oct. 30, 1934 |
| 2,199,095 | Banker | Apr. 30, 1940 |
| 2,230,293 | Harris | Feb. 4, 1941 |
| 2,555,702 | Railton | June 5, 1951 |
| 2,709,372 | Melone | May 31, 1955 |